United States Patent [19]

Dragoo et al.

[11] Patent Number: 4,551,829
[45] Date of Patent: Nov. 5, 1985

[54] WAVELENGTH DIVISION MULTIPLEXED FIBER-OPTIC CABLE SYSTEM WITH NON-UNIQUE TERMINAL TYPES

[75] Inventors: Robert E. Dragoo, Melbourne; James R. Teague, Indialantic; Lee M. Burberry, W. Melbourne; David C. Bailey, Cocoa Beach; Andrew M. Bardos, Indian Harbor Beach; Barry G. Grossman, Satellite Beach, all of Fla.

[73] Assignee: Harris Corporation, Melbourne, Fla.

[21] Appl. No.: 356,304

[22] Filed: Mar. 10, 1982

[51] Int. Cl.[4] ................................................ H04B 9/00
[52] U.S. Cl. ...................................... 370/3; 350/96.16; 370/30; 370/32
[58] Field of Search ............................ 370/3, 30, 32; 350/96.15, 96.16, 96.18, 96.19, 96.20

[56] References Cited

U.S. PATENT DOCUMENTS

| | | | |
|---|---|---|---|
| 4,213,677 | 7/1980 | Sugimoto et al. | 350/96.15 |
| 4,288,868 | 9/1981 | Grotjohann et al. | 370/30 |
| 4,303,303 | 12/1981 | Aoyama | 350/96.2 |
| 4,322,126 | 3/1982 | Minowa et al. | 350/96.16 |
| 4,374,390 | 2/1983 | Lee | 357/17 |
| 4,449,244 | 5/1984 | Kopainsky | 370/3 |

FOREIGN PATENT DOCUMENTS

55-120241  9/1980  Japan ........................ 370/3

Primary Examiner—Joseph A. Orsino, Jr.
Attorney, Agent, or Firm—Antonelli, Terry & Wands

[57] ABSTRACT

A wavelength division multiplexed fiber-optic communication system employs a pair of terminal stations, at opposite ends of the fiber-optic link, with the base configuration of each terminal station being the same. In each station a selective coupling arrangement is provided between the source or transmitter devices as well as the receiver devices and the single optical fiber over which the transmission are to take place so as to effectively make the terminals interchangeable. For achieving this purpose, each terminal station is comprised of a transmitter or source arrangement that is capable of generating a plurality of wavelengths. Similarly, each terminal station includes a receiver or detector which is capable of detecting the plurality of wavelengths that are selectively available for transmission or generated by the transmitter or source. The transmitter or source may comprise a single multiwavelength source such as a dual semiconductor laser generator the control and bias connections for which provide the selectivity for the wavelength of interest. Similarly, a multiple wavelength sensitive receiver, constituting a single unit, is associated with the multiple wavelength source. The multiple wavelength transmitter device may also be comprised of a plurality of individual transmitter or source devices the activation of which is selected by controllably switching or engaging the desired source.

2 Claims, 8 Drawing Figures

WAVELENGTH DIVISION MULTIPLEXED FIBER-OPTIC CABLE SYSTEM WITH NON-UNIQUE TERMINAL TYPES

FIELD OF THE INVENTION

The present invention relates to optical communication systems and is particularly directed to a scheme for achieving full duplex optical communications over a single fiber-optic cable through the use of a new and improved terminal station transceiver/interface configuration.

BACKGROUND OF THE INVENTION

The development and practical realization of electro-optical communication systems employing fiber optic cables has witnessed the application of such systems to a variety of schemes, for example in telecommunications and computer networks, previously involving radio or copper wire cables. In order to provide full duplex communication capability, the optical fiber networks that have been employed to date have often included dedicated fibers for each direction of transmission. This approach obviously entails substantial cost and hardware, due to the number of fibers required.

One approach to alleviate this cable complexity problem is to employ a single optical fiber which carries communications in both directions. In implementing such a system, in order to provide the required channel separation, wavelength division multiplexed (WDM) communication schemes have been proposed. Examples of WDM devices are described in the U.S. patents to Nosu et al U.S. Pat. No. 4,244,045, Kobayashi U.S. Pat. No. 4,198,117, Tomlinson U.S. Pat. No. 4,111,524 and Sugimoto et al U.S. Pat. No. 4,289,373. In general, a WDM device is capable of coupling into or splitting out of two or more wavelengths of optical information. Typically the network is comprised of a pair of terminal stations interlinked by one or more repeaters distributed along the fiber optic through which the terminal stations communicate with each other. In the terminal station at one end of the single fiber highway there is usually provided an optical source or transmitter which generates a prescribed optical wavelength that is different from the optical wavelength generated by the source or transmitter at the opposite end of the highway. Also, each terminal station that contains the transmitter includes a receiver that detects the incoming wavelength transmitted by the other source. Namely, each wavelength is associated with a particular direction of transmission, one wavelength being used for transmissions in a west-to-east direction and the second wavelength being used for transmissions in the opposite or east-to-west direction over the same single fiber. To maximize isolation between channels (or wavelengths) at each terminal station, separate passband filters may also be coupled between a respective source or a detector and the optical waveguide coupling to the single fiber. An example of this type of system is described in U.S. patent to Sugimoto et al U.S. Pat. No. 4,289,373 referenced above.

Unfortunately, in this customary approach for implementing a WDM communication system, the configuration of each respective terminal station is unique, requiring that the optical wavelength to be used in a particular communication direction be dedicated beforehand, thereby preventing modification of the system once installed.

SUMMARY OF THE INVENTION

In accordance with the present invention, rather than adopt the undesirable practice of employing unique terminal type, described above, the base configuration of each terminal station is the same and a selective coupling arrangement is provided between the source or transmitter devices as well as the receiver devices and the single optical fiber over which the transmissions are to take place so as to effectively make the terminals interchangeable. For achieving this purpose, each terminal station is comprised of a transmitter or source arrangement that is capable of generating a plurality of wavelengths. Similarly, each terminal station includes a receiver or detector which is capable of detecting the plurality of wavelengths that are selectively available for transmission or generation by the transmitter or source. The transmitter or source may comprise a single multiwavelength source such as a dual semiconductor laser generator the control and bias connections for which provide the selectivity for the wavelength of interest. Similarly, a multiple wavelength sensitive receiver, constituting a single unit, is associated with the multiple wavelength source. The multiple wavelength transmitter device may also be comprised of a plurality of individual transmitter or source devices the activation of which is selected by controllably switching or engaging the desired source.

In a first embodiment of the invention, a pair of sources, each generating a prescribed wavelength, form a dual wavelength transmitter facility that is associated with a multiple wavelength sensitive receiver. Preferably, the wavelengths at which these devices operate are longer than the approximately one micrometer or less wavelengths of conventional schemes. These three transceiver components are coupled to a coupler-switch arrangement that effectively feeds the selected one of the source wavelengths to the single optic fiber cable for transmission to the terminal station at the opposite end of the fiber cable. At the same time, the coupling arrangement provides for the coupling of an optical wavelength, different from that being transmitted, and received from the remote terminal station over the single fiber cable to the receiver or detector component of the terminal station of interest. This coupling-switch arrangement may comprise a 3:2 optical switch which is associated with a 2:1 dichroic coupler or it may comprise an integrated arrangement that selectively couples the transmitter and the multiple wavelength receiver or detector to the single optical fiber cable over which the multiple wavelengths are transmitted.

In a second embodiment of the invention, each terminal station may comprise a dual wavelength source and a dual wavelength receiver or detector. Each of these units may be comprised of semiconductor electro-optic devices each capable of operating at the pair of wavelengths of interest. As in the first embodiment, the wavelengths at which these devices operate are preferably longer than the approximately one micrometer or less wavelengths of conventional schemes. When properly biased and controlled, the dual wavelength source generates or emits only a single wavelength of interest for transmission over the optical fiber to the terminal station at the opposite end of the fiber. The dual wavelength sensitive receiver semiconductor device is responsive to either wavelength. The single optical fiber may be coupled to each dual wavelength source and each dual wavelength detector through a biconically tapered coupler. Control logic associated with driver/amplifier stages for the respective source and detector units couples signals between respective distribution switches. Data to be transmitted out over the fiber is coupled through a 1:2 switch which is selectively energized to couple the transmission data to the dual wavelength source for transmission over the optical fiber using the selected wavelength. Similarly, incoming signals received by the dual wavelength detector are coupled through a 2:1 switch to a received signal output line.

In either embodiment of the invention, the inventive approach eliminates the requirements for unique terminal types. Thus, what is effectively a universal transmitter/receiver terminal unit can be installed at each end of the single fiber transmission medium without having to discriminate whether the unit will be associated with a particular transmission wavelength for achieving full duplex mode communications. As a result, a considerable logistic savings can be realized from the common module designation as compared with the conventional approach of employing an independent transmitter and receiver type configuration, such as that described in the above-referenced patent to Sugimoto et al.

Moreover, with the configuration of the first embodiment of the invention, the use of a dichroic coupler and optical switch minimizes system losses allowing greater terminal separation than that obtainable with passive couplers and optical filters. This reduces the number of components employed and also provides improved crosstalk rejection.

In addition the longer wavelengths at which the devices of the invention are capable of operating enable the system to exhibit lower fiber dispersion, lower transmission loss characteristics, greater spacing between repeaters and improved radiation recovery times.

DETAILED DESCRIPTION

Figure 1:
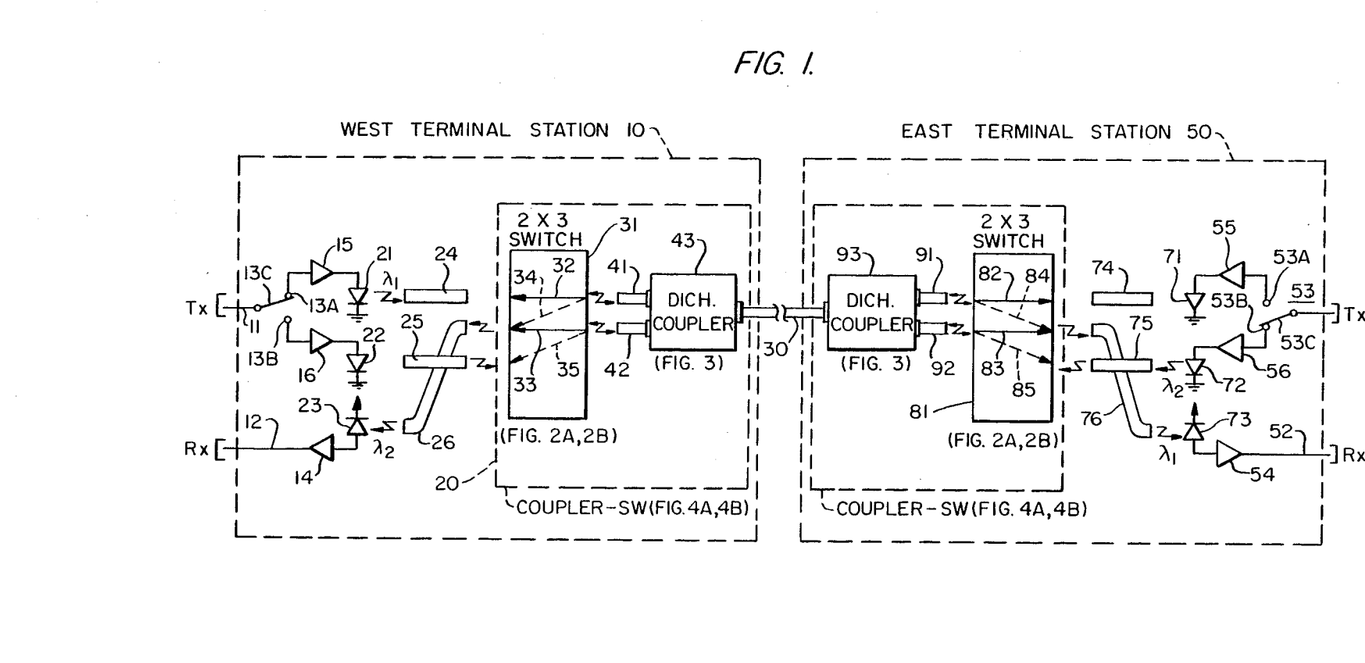
FIG. 1 is a schematic illustration of the overall network configuration (absent repeaters) of a full duplex mode optical transmission system employing nonunique terminal types in accordance with a first embodiment of the present invention.

Referring now to FIG. 1 of the drawings, wherein a first embodiment of a full duplex mode single optical fiber transmission system in accordance with the present invention is illustrated, the single optical fiber over which the light wave communications are to take place is coupled at its opposite ends to respective terminal stations 10 and 50. For purposes of illustration, terminal station 10 will be denoted as a west terminal station which transmits optical signals over optical fiber 30 in a west-to-east direction and receives incoming signals from the east terminal station 50 that have been transmitted thereby over optical fiber 30 in an east-to-west direction. Similarly, east terminal station 50 receives incoming signals transmitted from the west terminal station 10 and transmits optical signals over optical fiber 30 to the west terminal station 10. The system may also employ one or more repeater stations distributed along cable 30. However, an illustration of such repeater stations has been omitted in order to simplify the drawing.

In accordance with the present embodiment, each terminal station 10 includes a pair of light emitting sources, such as light emitting diodes 21 and 22 that are capable of generating optical outputs at respectively different wavelengths. For this purpose source 21 may be a light emitting diode whose output wavelength is 1.57 micrometers while source 22 may also be a light emitting diode the optical transmission from which has a wavelength of 1.27 micrometers. As mentioned earlier these wavelengths are longer than approximately one micrometer or less wavelengths customarily employed and enable the invention to offer advantages described briefly above and reiterated below. Coupled to each of these respective sources are drivers 15 and 16 the inputs of which are coupled to switch terminals 13A and 13B, respectively, of a switch 13. The switchable arm 13C of switch 13 is coupled to an input transmission signal line 11. It should be noted that an electrical representation of switch 13 is simply provided for purposes of illustration and does not imply or designate any particular switch type. In its actual configuration, the switch 13 may be an electronic switch. The purpose of the switch 13 is to selectively couple the input transmission line 11 to one of the sources 21 and 22. Digital signals, for example, provided on line 11 would effectively pulse the selected source, either source 21 or source 22, on or off to provide digital optical outputs for coupling over the single fiber line 30 by way of the coupler-switch 20. Incoming optical signals, on the other hand, are coupled to an optical detector 23. The output of detector 23 is coupled through an amplifier 14 which, in turn, supplies the signal to a received signal line 12. Preferably optical detector 23 is a dual wavelength optical detector capable of sensing signals at each of the wavelengths available from sources 21 and 22. An example of such a detector, as developed by Bell Telephone Laboratories, will be described below with reference to FIG. 6.

Outgoing signals transmitted by source 21 are coupled to one end of an optical fiber 24, the opposite end of which is coupled to a coupler-switch 20. Similarly, the output of source 22 is coupled to one end of optical fiber 25 the opposite end of which is also coupled to a coupler-switch 20. Depending upon the selected wavelength, signals of one of these fibers 24 and 25 will be coupled for transmission to single fiber cable 30. Incoming signals from the opposite terminal station 50 that are coupled from single fiber cable 30 through coupler-switch 20 are fed to one end of an optical fiber 26, the opposite end of which is coupled to dual wavelength detector 23 for sensing signals transmitted from terminal station 50 over fiber 30.

In the embodiment as shown in FIG. 1, coupler switch 20 is configured as a 2×3 optical switch 31 and an associated dichroic coupler 43. The 2×3 optical switch 31, to be described in detail below in connection with the description of FIGS. 2A and 2B, couples light signals associated with fibers 24, 25 and 26 to a pair of fibers 41 and 42. A first pair of signal paths 32 and 33, shown in solid line form, for a first switch position of 2×3 optical switch 31, couple optical fibers 24 and 26 to fibers 41 and 42. For a second switch position of optical switch 31, optical fibers 26 and 25 are respectively coupled over switch paths 34 and 35 (shown in broken line form) to optical fibers 41 and 42. Dichroic coupler 43, shown in detail in FIG. 3, to be described below, couples the transmission wavelength that is coupled through optical fiber 41 for transmission over the single fiber 30 and it also couples the received wavelengths from terminal station 50 to optical fiber 42. Thus, within the 2×3 optical switch 31, each of paths 32 and 35 is a transmission path for transmitting one of the selected wavelengths produced by either source 21 or source 22 to one of optical fibers 41 and 42. On the other hand, coupling paths 34 and 33 couple the receive wavelength, not chosen for transmission, from dichroic coupler 43 to optical waveguide 26.

The east terminal station 50 is internally configured the same as that of the west terminal station so that, as mentioned briefly above, each terminal station is identically configured, there being no unique terminal types. For purposes of transmitting incoming signals supplied to signal line 51, a switch 53, having a switchable arm 53C and output terminals 53A and 53B, is coupled to a pair of drivers 55 and 56. The outputs of these drivers are coupled to respective sources 71 and 72 which operate at respectively different wavelengths. Again, the wavelengths are identical to those used in terminal station 10. Signals emitted by sources 71 and 72 are respectively coupled over optical waveguides 74 and 75 to a 2×3 optical switch 81 configured identically to that of 2×3 optical optical switch 31 in the west terminal station 10. 2×3 optical switch 81 couples signals between a pair of optical waveguides 91 and 92 over paths 82 and 83 to optical waveguide 76 or, in a second position, couples signal from optical waveguides 91 and 92 to optical waveguides 76 and 75, respectively, over signal paths, 84 and 85, shown in broken line form. Dichroic coupler 93 couples signals between single optical fiber 30 and waveguides 91 and 92. Signals that have been received at the east terminal 50 station are coupled from optical waveguide 76 to a dual-wavelength sensitive detector 73. The output of detector 73 is coupled to an amplifier 54 and supplied to received signal line 52.

For achieving full duplex mode communication capability, over the single optical fiber 30, separate wavelengths are employed for carrying communications in the opposite west-to-east and east-to-west directions. For example, with each terminal station being non-unique, and each containing a transmission wavelength selection switch 13 (53), it will be assumed that west-to-east transmissions are to take place over a first wavelength $\lambda_1$ and east-to-west transmissions are to take place over a second wavelength $\lambda_2$. As a result, at terminal station 10, switch 13 is engaged to couple data signal line 11 to driver 15 and thereby cause optical source 21 to generate an optical output at the first wavelength $\lambda_1$. The second source 22 is disconnected from the data signal line and is effectively unbiased so that it produces no output. Conversely, at terminal station 50, switch 53 is coupled to switch data signal line 51 to driver 56, so that source 72 produces optical wavelength $\lambda_2$ in accordance with the signals supplied over line 51. Source 71 which, when energized, produces an output at wavelength $\lambda_1$, is disconnected from the circuit.

Figure 2A:
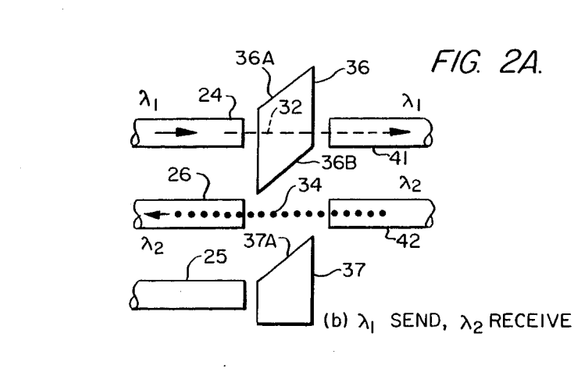
FIGS. 2A and 2B are respective illustrations of a 2×3 optical switch that may be employed in the coupler switch unit of a terminal station of the embodiment of the invention shown in FIG. 1.

In accordance with a first configuration of the coupler switch 20 for the present embodiment of the invention, a 2×3 optical switch 31 and a dichroic coupler 43 may be employed. An illustration of the 2×3 optical switch as employed in respective terminal stations 10 and 50 is shown in respective FIGS. 2A and 2B. For terminal station 10, the configuration of optical switch 31 is as shown in FIG. 2A. Optical switch 31 may comprise a displaceable prism or diffraction element 36 and moveable reflector element 37. Prism 36 includes a pair of reflecting end faces 36A and 36B while displaceable reflector element 37 includes a reflecting face 37A. At terminal station 10, where wavelength $\lambda_1$ is the selected transmission wavelength of interest, prism 36 and reflector element 37 are positioned as shown in FIG. 2A with each of reflecting faces 36A and 36B out of each of signal paths 32 and 34 between optical waveguides 24 and 41 and optical waveguides 26 and 42, respectively. Thus, optical wavelength $\lambda_1$ passes through prism 36 from waveguide 24 to outgoing waveguide 41. An incoming received optical signal on wavelength $\lambda_2$ from dichroic coupler 43 is coupled from an end face of optical waveguide 42 through the open area between face 36B of prism 36 and face 37A of reflecting element 37 and passes directly into optical waveguide 26, as shown. No optical signals are coupled into optical waveguide 25 for transmission and the position of displaceable reflecting element 37 insures that no light, if present in waveguide 25, can be coupled to either of waveguides 41 and 42.

Figure 2B:
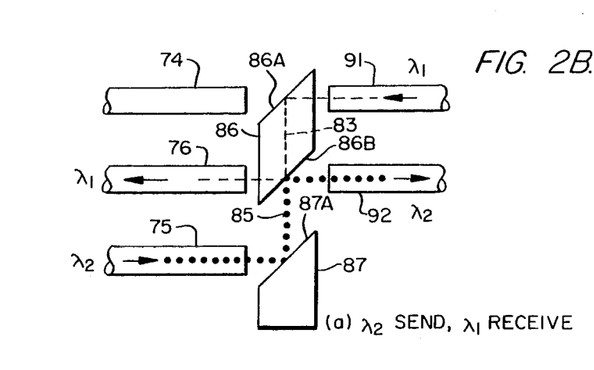

In a complementary sense, within terminal station 50, where the transmission wavelength is $\lambda_2$ and the incoming or received wavelength of interest from terminal station 10 is $\lambda_1$, the positions of prism 86 and reflecting element 87 are as shown in FIG. 2B. Namely, prism 86 and reflecting element 87 are displaced downwardly in the FIG. 2B as compared with the position of prisms 36 and 37 in FIG. 2A. In this position, received optical wavelength $\lambda_1$ from terminal station 10 and coupled through dichroic coupler 93 is coupled from optical waveguide 91 into the prism 86. The signal reflects off internal reflecting faces 86A and 86B of prism 86 and then travels into optical waveguide 76. Outgoing optical wavelength $\lambda_2$, on the other hand, from waveguide 75, reflects off reflecting face 87A of reflecting element 87 and then the outer reflecting surface of face 86B of prism 86 into optical waveguide 92. Thus, incoming signals are coupled over path 83 between waveguides 91 and 76 by way of prism 86, per se, whereas outgoing transmitted signals at wavelength $\lambda_2$ are transmitted over signal path 85 reflecting off face 87A of reflecting element 87 and face 86B of prism 86. It should be noted that each of the prisms and the reflecting elements in the optical switches is mounted on a suitable mechanically moveable medium (not shown), for example as described in the U.S. patent to Aoyama U.S. Pat. No. 4,239,331, the movement of which may be responsive to a control member that is ganged with the switch 13 (53) that controls the selected transmission wavelength.

Figure 3:
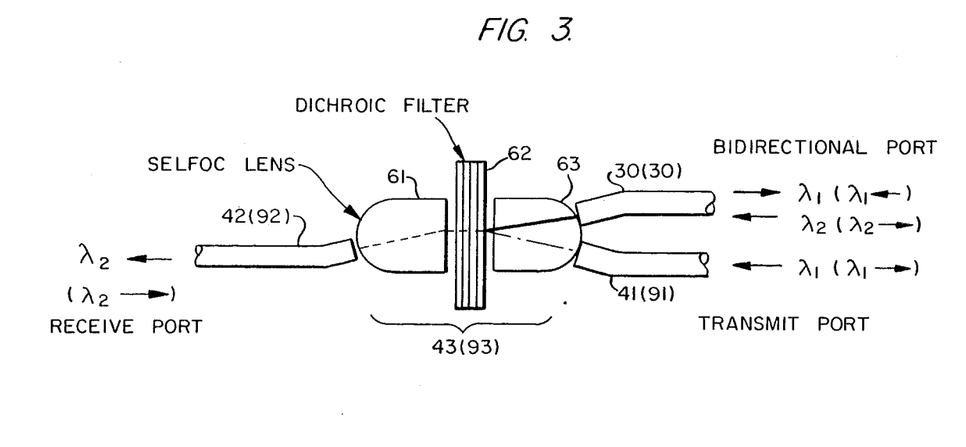
FIG. 3 shows a dichroic coupler that may be associated with the 2×3 optical switch shown in FIGS. 2A and 2B within the coupler switch of the terminal station at the embodiment of the invention shown in FIG. 1.

FIG. 3 illustrates the configuration that the dichroic coupler 43 (93) may take. The dichroic coupler itself may be configured in the manner described in the U.S. patent to Sugimoto et al U.S. Pat. No. 4,213,667. The coupler is bidirectional and includes a dichroic filter 62 on opposite sides of which are a pair of SELFOC lenses 61 and 63. Considering the dichroic coupler 43 within the coupler switch 20 of terminal station 10, for example, optical waveguide 42 is coupled to SELFOC lens 61 whereas optical waveguide 41 is coupled to SELFOC lens 63. The single optical fiber cable 30 is also coupled to SELFOC lens 63, with the single optical fiber forming a bidirectional port carrying wavelengths $\lambda_1$ and $\lambda_2$ in opposite directions. Incoming signals from terminal station 50 that are coupled over optical fiber 30, namely at wavelength $\lambda_2$ are introduced from optical fiber 30 through SELFOC lens 63 to dichroic filter 62. Dichroic filter 62 contains an interference coating that passes wavelengths at $\lambda_2$ (1.57 μm) and reflects wavelengths at $\lambda_1$ (1.27 μm). Thus, wavelength $\lambda_2$ passes through dichroic filter 62 and is directed by SELFOC lens 61 to optical fiber 42. On the other hand, outgoing transmission wavelength $\lambda_1$ from optical fiber 41 is introduced by SELFOC lens 63 to be reflected off dichroic filter 62 and be transmitted by a single optical fiber 30 towards terminal station 50. Of course, at terminal station 50 at the opposite end of the single optical fiber 30, dichroic coupler 93 achieves the same type of coupling except that the direction of transmission of the respective wavelengths is reversed. However, the filter is bidirectional, passing wavelength $\lambda_2$ and reflecting wavelength $\lambda_1$ in either direction so that the same effect is achieved. This is illustrated by the parenthetical designations of direction of transmission for the respective wavelengths of $\lambda_1$ and $\lambda_2$ as shown.

Figure 4A:
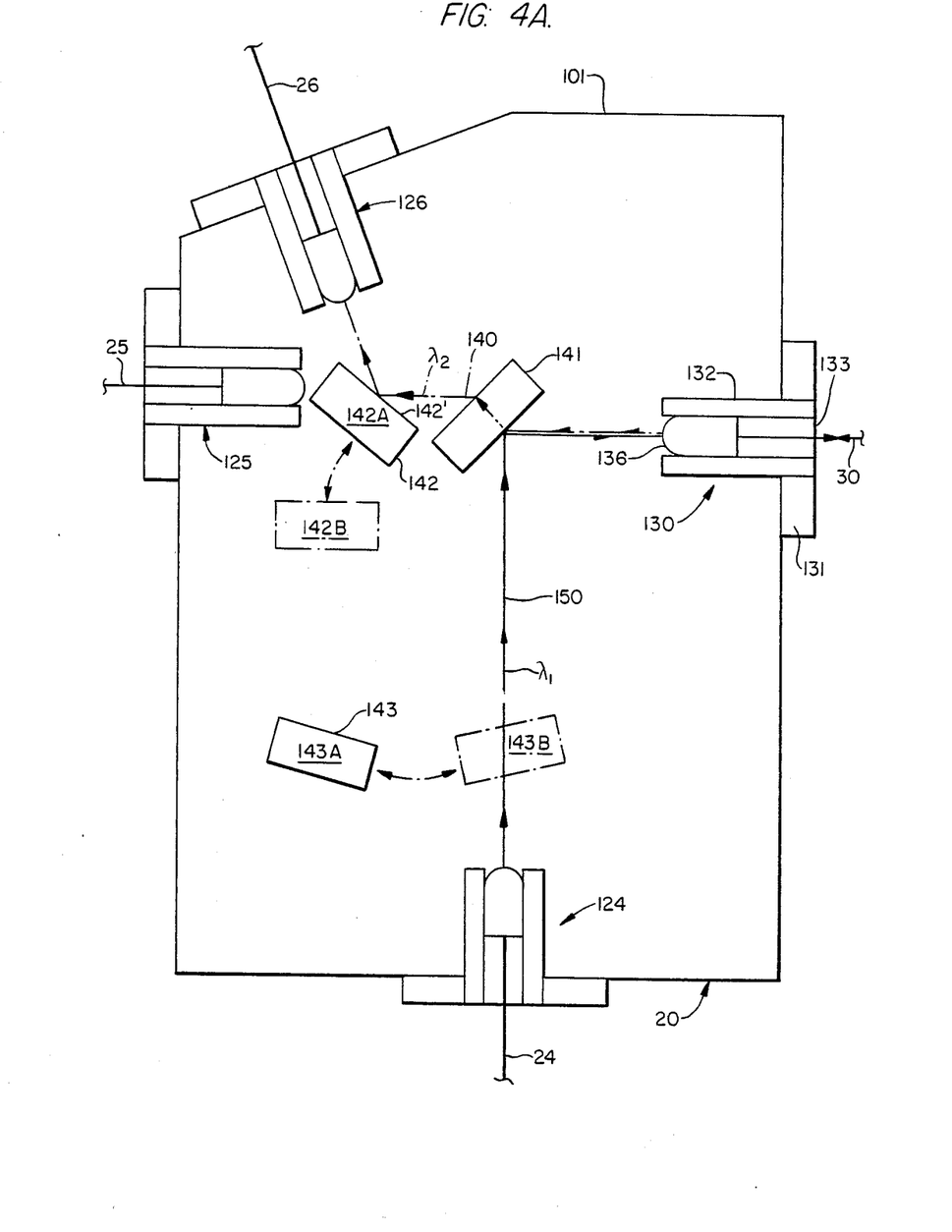
FIGS. 4A and 4B show the configuration of a combined optical switch/dichroic coupler integrated in a common arrangement that may be substituted for the 2×3 optical switch and dichroic coupler shown in FIGS. 2A, 2B and FIG. 3 within a terminal station in accordance with the first embodiment of the invention shown in FIG. 1.
Figure 4B:
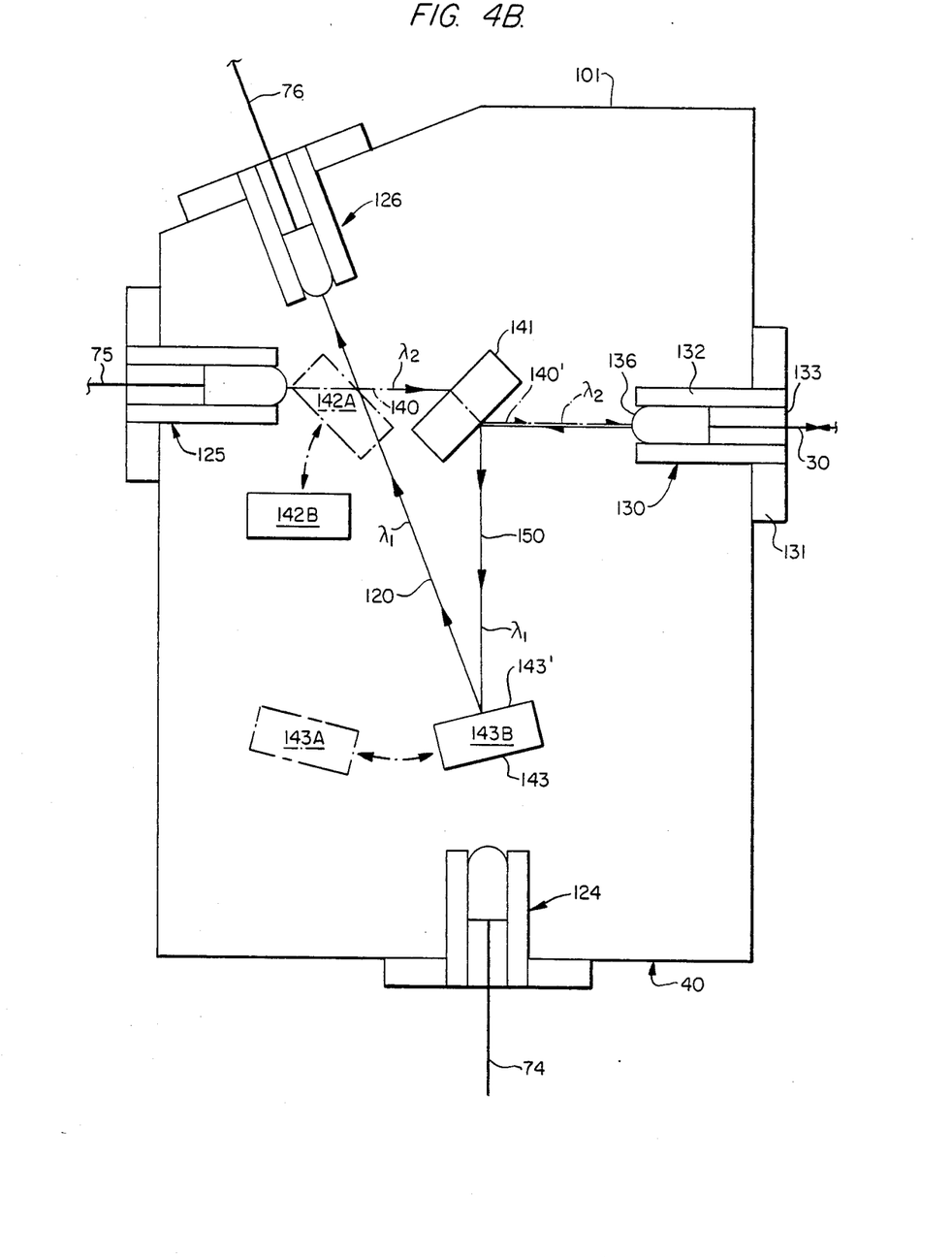

In place of the use of a 2×3 optical switch and an associated dichroic coupler illustrated in FIGS. 2A, 2B and 3, described above, the coupler-switch unit 20 may be an integrated arrangement as shown in FIGS. 4A and 4B. Each of FIGS. 4A and 4B shows the same unit 40 except for different positions of rotatable mirrors depending upon which wavelengths are employed for transmission in the respective terminal stations. FIG. 4A shows the internal position of the components of the integrated coupler-switch at terminal station 10, whereas FIG. 4B shows the internal configuration of the components of the coupler switch for terminal station 50.

Referring now to FIG. 4A, the integrated arrangement of the coupler switch 20 employed in the west terminal station 10 is shown. Incoming optical waveguides 24 and 25 are fed into and retained by lens coupling units 124 and 125, respectively. Similarly, optical waveguide 26 is held by and fed from lens coupling unit 126 whereas optical fiber 30 is retained by and optically coupled to lens coupling unit 130. Each unit is identically configured and only unit 130 will be described in detail to simplify the description.

Lens coupling unit 130 includes a rods lens 136 which abuts against one end of the fiber 30 feeding into the coupling unit. Cylindrically shaped ceramic ferrules 132 and 133 confine the lens and the fiber within the unit in a unitary fashion. An annular cap 131 surrounds ferrule 132 and is used to mount the lens coupling unit to the housing 101 of the coupler switch 20. Within the interior of the housing a dichroic filter 141 similar to dichroic filter 62 in the dichroic coupler shown in FIG. 3 is disposed. Also provided are a pair of rotatable mirrors 142 and 143. In the configuration of the terminal station 10 of interest, wherein wavelength $\lambda_1$ (1.27 μm) is the outgoing transmission frequency and the wavelength $\lambda_2$ (1.57 μm) in the incoming reception frequency, mirrors 142 and 143 are positioned as shown. Namely, mirror 143 is positioned at position at 143A out of the path of the light from coupling unit 124 to dichroic filter 141. This light path is designated as path 150 as shown, so that wavelength $\lambda_1$ which is coupled to coupling unit 124 passes unimpeded along path 150, is reflected off dichroic filter 141 and impinges upon lens 136 of coupling unit 130. Through lens 136, wavelength $\lambda_1$ is coupled over outgoing optical fiber link 30 to the east terminal station 50. On the other hand, mirror 142 is positioned such that it blocks any light signals coupled over optical waveguide 25 to coupling unit 125. The face 142' of mirror 142 is positioned to reflect signals passing along path 140 towards coupling unit 126. In effect, incoming signals at wavelength $\lambda_2$ (1.57 μm) are coupled through coupling unit 130 from the single fiber cable 30 towards dichroic filter 141. Since dichroic filter 141 passes wavelength $\lambda_2$, incoming signals from terminal station 50 pass through the dichroic filter 141 and travel along path 140 towards the face 142' mirror of 142. The signals at wavelength $\lambda_2$ are then reflected off face 142' and directed towards the lens of coupling unit 126 to be coupled to waveguide 26.

FIG. 4B shows the positioning of mirrors 142 and 143 in the coupler switch 40 at the east terminal station 50 to achieve the intended coupling effects for respective wavelengths $\lambda_1$ and $\lambda_2$. In this position, mirror 143 is rotated to position 143B so that reflecting surface 143' thereof faces dichroic filter 141. Mirror 142 is positioned out of path 140 so that incoming wavelength $\lambda_2$ to be transmitted out over the optical fiber cable will pass from waveguide 75 directly to dichroic filter 141.

More specifically, at the east terminal station 50, with the second source 72 selected by virtue of switch 53, the second wavelength ($\lambda_2$) is used for transmission. The second wavelength $\lambda_2$ is coupled over optical waveguide 75 and coupled to the coupler switch 40. Through coupling unit 125, the transmission wavelength $\lambda_2$ passes along path 140 to dichroic filter 141. Dichroic filter 141 passes wavelength $\lambda_2$ so that it travels along path 150 to lens 136 of coupling unit 130. From lens 130, wavelength $\lambda_2$ is then coupled out over the optical fiber 30 to be transmitted to the west terminal station 10. Incoming signals from the west terminal station over link 30 at wavelength $\lambda_1$ are reflected by dichroic filter 141 and these signals pass along path 150 to be reflected by surface 143' of mirror 143. From the surface 143', the signals at wavelength $\lambda_1$ travel along path 120 directly to the coupling unit 126 to be coupled to waveguide 76 and then to optical detector 73.

Thus, the coupler switch shown in FIGS. 4A and 4B is identically configured for each terminal station. However, when selecting the wavelength of transmission, the internal mirrors are positioned in or out of the respective optical paths between the dichroic filter and the coupling units, just as the prisms within the 2×3 optical switches shown in FIGS. 2A and 2B are positioned in accordance with the transmission wavelength chosen.

Figure 5:
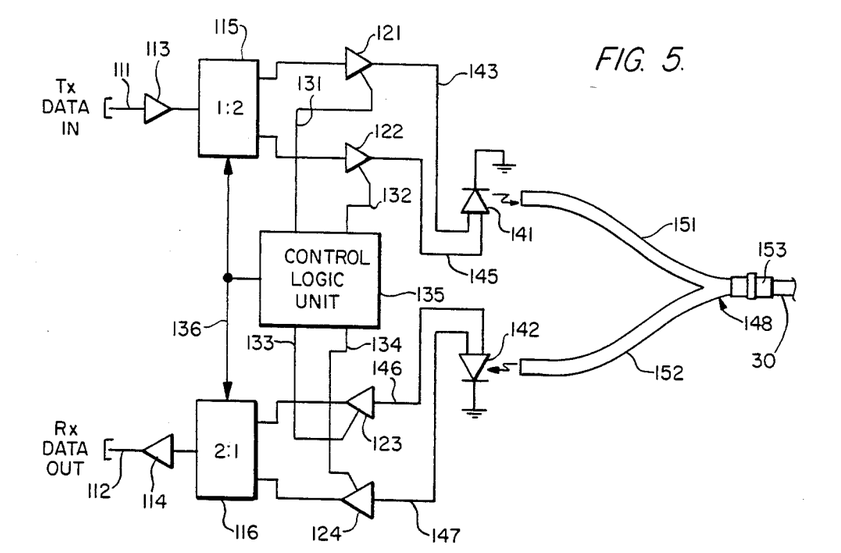
FIG. 5 illustrates a second embodiment of the invention employing selectively activated dual wavelength sources and detectors.

FIG. 5 shows another embodiment of the invention where in place of separate source units for the respective transmission wavelengths $\lambda_1$ and $\lambda_2$, a dual wavelength source is employed. To facilitate the present description, the component parts of only a single terminal station, here west terminal station 10, will be described. (The configuration of the east terminal station 50 is identical to that of the west terminal station as in the first embodiment described above in conjunction with FIG. 1.) Incoming signal line 111 is coupled through a driver 113 to a 1:2 controlled coupler switch 115. The received signal line 112 is coupled from an amplifier 114 and a 2:1 combining electronically controlled switch 116. The control of each of switches 115 and 116 is effected by a control logic circuit 135 via line 136. 1:2 switch 115 selectively connects the output of driver 113 to one of a pair of amplifier drivers 121 and 122. In other words, switch 115 is a simple order demultiplexer. Similarly, switch 116 is a simple multiplexer coupling the output of one of amplifiers 123 and 124 to amplifier 114. The output of each of drivers 121 and 122 is coupled over line 143 and 145, respectively, to a dual wavelength light emitting diode source 141. Source 141 may comprise a ternary, quaternary semiconductor structure such as GaAs, GaInAs and GaInAsP multilayer device with the respective layers being sensitive to particular wavelengths such as the 1.57 and 1.27 $\mu$meters, described previously for independent source wavelengths. In effect, drivers 121 and 122 controllably bias these layers to select which wavelength will be generated. Control of drivers 121 and 122 by control logic 135 is effected through respective signal lines 131 and 132.

On the receiving side, dual wavelength detector 142 may comprise a dual wavelength PIN detector having a pair of outputs coupled over lines 146 and 147 coupled to amplifiers 123 and 124. Dual wavelength source 121 and detector 142 may be configured as semiconductor devices shown in FIG. 6, to be described below. As will be described below, whether the device is used as a source or detector and at which wavelength it operates depends simply upon the manner in which it is biased. Optical coupling to and from the respective source and detector units may be achieved through a biconically tapered coupler 148 having a transmission portion 151 and a receiving portion 152 and optical fiber connector 153. Connector 153 joins the biconically tapered coupler 148 to a single fiber cable 30 which carries the full duplex mode communications to and from the east station. For selectively energizing driver/amplifier units 121–124, a control logic circuit 135 is provided. Through this unit, one of the drivers of the station of interest is engaged or activated when one of the demultiplex lines of unit 115 is selected. An outgoing transmission over the single fiber cable at wavelength $\lambda_1$, for example, is received at the opposite station and detected by the dual wavelength detector therein. Through lines 133 and 134, control logic circuit 135 monitors which wavelength is being received and responds to this wavelength to thereby selectively control multiplexer 116 and its own outgoing driver and switch 115 unit for the opposite wavelength. Namely, each terminal is not constrained to transmit or receive on a specific wavelength since both the source and detector units are suitable for transmitting on either of the pair of wavelengths inherent in their physical semiconductor structure. Consequently, a single transceiver unit may support the communication requirements at each opposite end of the link without prior knowledge as to which wavelength is required for transmission and reception. The detector 142 at either end of the link will detect activity on one of the two available wavelengths and, via lines 131, 132 and 136, cause its associated control logic circuit 135 to engage the transmission circuitry for the opposite wavelength. If no activity is detected, then either of the wavelengths may be selected by an operator control interface or by random selection logic to the control logic unit 135.

Figure 6:
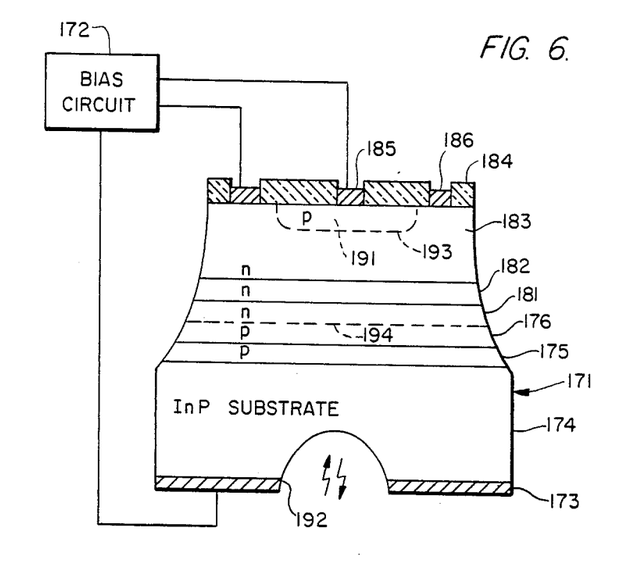
FIG. 6 is a cross-sectional side view of a semiconductor device that may be used as a dual wavelength detector or source.

FIG. 6 illustrates a cross-sectional side view of an exemplary configuration of a semiconductor device (developed by Bell Telephone Laboratories) that may be used as a dual wavelength detector in the above described embodiments of FIGS. 1 and 2 or as a dual wavelength source in the embodiment of FIG. 5. The detector/source device 171 is comprised of a multilayer semiconductor structure disposed upon a transparent substrate. As mentioned above the materials may comprise ternary or quaternary semiconductor materials. The lower face of the device 171 has a circular depression 192 formed in a transparent substrate 174 onto which a received wavelength is directed when the device is used as a detector and from which a selected wavelength is emitted when the device is employed as a source. The multilayer structure of the device proper further includes a p-type layer 175 formed on substrate 174. On the p-type layer 175 there is formed a p-type layer 176. Layer 176 is contiguous with an n-type region 181 forming a PN junction 194 thereon. Atop n-type region 181 is a further n-type layer 182 that is continguous with upper n-type layer 183. A p-type region 191 is diffused in n-type layer 183 so as to form a second PN junction 193 therebetween. A passivating layer, such as a layer of silicon nitride, is formed on the upper surface of n-type layer 183. Through-holes to p-type region 191 and an annular shaped surface region of layer 183 are formed in passivating layer 184, so as to provide contact regions for bias contact layers 185 and 186, respectively. A further bias contact layer 173 is disposed on the bottom face of substrate 174 but exposing circular depression 192.

A bias circuit 172 is coupled between contact layer 173 and contact layers 185 and 186. Bias circuit is controlled to selectively bias a central portion of the device, through contact 185, PN junction 193 and contact 186 for operation at a first wavelength, or an annular portion of the device through contact 186, PN junction 194 and contact 173 for operation at a second wavelength. The bandgap of layer 181 is larger than that of region 183. When the device is used as a detector bias circuit 172 couples a prescribed reverse bias across both PN junctions 193 and 194, thus receiving wavelengths with the first detector (for $\lambda_1$) acting as a filter to preclude the second detector (for $\lambda_2$) from receiving spurious $\lambda_1$ signals. When used as a source the bias circuit imparts a prescribed forward bias to the selected PN junction for generation of the selected wavelength to be emitted.

As mentioned earlier and as will be appreciated from the foregoing description, the optical communication scheme in accordance with the present invention offers a number of advantages over multiple and single fiber networks heretofore proposed. A common (universal) transmitter/receiver terminal unit can be implemented as a single module without prior knowledge as to what wavelengths will be employed for transmission and reception. As a result a considerable logistics savings can be realized from the common module designation compared to independent (unique) transmitter/receiver units. Moreover, the use of longer wavelengths significantly increases the distance between required repeaters along the optical fiber cable, resulting in further savings for long distance transmission systems.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with a single fiber-optic communication system, a transceiver apparatus comprising:

a multiple wavelength source of optical energy capable of controllably emitting a selected one of transmission wavelengths for application to a single optical fiber for transmission thereover;

a multiple wavelength detector capable of controllably detecting a prescribed one of said transmission wavelengths that has been transmitted over said single optical fiber;

control means, coupled to said multiple wavelength source and said multiple wavelength detector, for selectively enabling said multiple wavelength detector to detect a first of said transmission wavelengths that has been transmitted over said single optical fiber, and for selectively enabling said multiple wavelength source to emit a second of said transmission wavelengths for transmission over said single optical fiber; and means for coupling said second of said transmission wavelengths emitted by said source into said single optical fiber for transmission thereover and for coupling said first wavelength received from said single optical fiber to said multiple wavelength detector.

2. A transceiver apparatus according to claim 1, wherein said coupling means includes a biconically tapered coupler optically coupling each of said source and said detector to said single optical fiber.

* * * * *